US011922076B2

(12) United States Patent
Tsuchiya

(10) Patent No.: US 11,922,076 B2
(45) Date of Patent: Mar. 5, 2024

(54) PRINT CONTROL DEVICE, PRINT CONTROL METHOD, THREE-DIMENSIONAL OBJECT PRINTING APPARATUS, AND NON-TRANSITORY COMPUTER-READABLE STORAGE MEDIUM STORING PROGRAM

(71) Applicant: SEIKO EPSON CORPORATION, Tokyo (JP)

(72) Inventor: Takeshi Tsuchiya, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 18/155,489

(22) Filed: Jan. 17, 2023

(65) Prior Publication Data

US 2023/0229364 A1    Jul. 20, 2023

(30) Foreign Application Priority Data

Jan. 18, 2022   (JP) ................................. 2022-005592

(51) Int. Cl.
G06F 3/12  (2006.01)

(52) U.S. Cl.
CPC .......... *G06F 3/1205* (2013.01); *G06F 3/1256* (2013.01)

(58) Field of Classification Search
CPC .............................. G06F 3/1205; G06F 3/1256
See application file for complete search history.

(56) References Cited

U.S. PATENT DOCUMENTS

| | | | |
|---|---|---|---|
| 6,721,879 B1 * | 4/2004 | Tanaka | G06F 1/24 713/1 |
| 9,857,783 B2 * | 1/2018 | Miwa | G05B 15/02 |
| 11,003,964 B2 * | 5/2021 | Kaiba | G06K 15/102 |
| 11,107,104 B1 * | 8/2021 | Brannan | H04L 51/046 |
| 11,376,866 B1 * | 7/2022 | Bullington | F26B 15/12 |
| 2015/0081050 A1 * | 3/2015 | Miwa | G05B 15/02 700/83 |
| 2015/0283825 A1 * | 10/2015 | Takai | G06F 3/1256 347/9 |
| 2016/0094745 A1 * | 3/2016 | Yamamoto | G06K 15/4065 358/1.14 |
| 2017/0019545 A1 * | 1/2017 | Konji | H04N 1/00416 |
| 2017/0187897 A1 * | 6/2017 | Shin | G06F 11/006 |
| 2018/0250973 A1 * | 9/2018 | Inoue | B41J 32/00 |
| 2019/0058744 A1 * | 2/2019 | O'Connor | H04L 67/54 |
| 2020/0241814 A1 * | 7/2020 | Kawaguchi | G06F 3/1204 |
| 2021/0055897 A1 * | 2/2021 | Tomihisa | H04L 51/10 |

(Continued)

FOREIGN PATENT DOCUMENTS

JP    2015-101038 A    6/2015

*Primary Examiner* — Helen Zong
(74) *Attorney, Agent, or Firm* — WORKMAN NYDEGGER

(57) ABSTRACT

A print control device used to control printing on a three-dimensional workpiece includes an acquisition unit that acquires workpiece information including information about the number of print surfaces of the workpiece, where an image is printed on each of the print surfaces, a controller that displays, on a display device, a print image setting portion for a user to set an image to be printed on each of the print surfaces, and a reception unit that receives an operation by the user via an input device, wherein the controller changes the number of the print image setting portions to be displayed on the display device according to the workpiece information.

16 Claims, 7 Drawing Sheets

(56) References Cited

U.S. PATENT DOCUMENTS

| | | | |
|---|---|---|---|
| 2021/0133450 A1* | 5/2021 | Nakayama | G06K 7/1417 |
| 2021/0165616 A1* | 6/2021 | Yasuda | G06F 3/1222 |
| 2021/0191672 A1* | 6/2021 | Saito | G06F 3/1272 |
| 2021/0218853 A1* | 7/2021 | Saeda | G06F 3/0482 |
| 2021/0224009 A1* | 7/2021 | Kikuchi | G06F 3/1205 |
| 2021/0349667 A1* | 11/2021 | Soma | G06F 3/1205 |
| 2022/0027100 A1* | 1/2022 | Abe | G06F 3/1292 |
| 2022/0057970 A1* | 2/2022 | Suzuki | G06F 3/0485 |
| 2022/0274341 A1* | 9/2022 | Ota | B29C 64/393 |

* cited by examiner

PRINT CONTROL DEVICE, PRINT CONTROL METHOD, THREE-DIMENSIONAL OBJECT PRINTING APPARATUS, AND NON-TRANSITORY COMPUTER-READABLE STORAGE MEDIUM STORING PROGRAM

The present application is based on, and claims priority from JP Application Serial Number 2022-005592, filed Jan. 18, 2022, the disclosure of which is hereby incorporated by reference herein in its entirety.

BACKGROUND

1. Technical Field

The present disclosure relates to a print control device, a print control method, a three-dimensional object printing apparatus, and a non-transitory computer-readable storage medium storing a program.

2. Related Art

In the field of printing, displaying a screen for a user to perform setting operations and previews before executing printing is known in the related art. On the other hand, in recent years, an object on which printing is to be performed is spreading from sheet-like media represented by recording paper to three-dimensional media having various shapes.

JP-A-2015-101038 discloses a printing system for continuously printing a plurality of images on both sides of a recording paper wound in a roll in which a preview screen is displayed by dividing the screen into a first preview region in which an image to be printed on the front side of a recording medium can be displayed and a second preview region in which an image to be printed on the back side can be displayed.

However, such a printing system may not be suitable for a three-dimensional object printing apparatus or the like that performs printing on each surface forming a three-dimensional object. For example, when performing printing on a sheet-like print medium as in JP-A-2015-101038, the number of print surfaces is either one of the front and back sides, or both the front and back sides. On the other hand, when performing printing on a three-dimensional object, the number of print surfaces may not be necessarily two, but may be three or more or may be only one depending on the shape of the three-dimensional object or the number of printing locations. From the point of view exemplified above, a need for providing a print control device suitable for performing printing on a three-dimensional medium and excellent in usability has existed.

SUMMARY

According to an aspect of the present disclosure, a print control device used to control printing on a three-dimensional workpiece includes an acquisition unit that acquires workpiece information including information about the number of print surfaces of the workpiece, where an image is printed on each of the print surfaces, a controller that displays, on a display device, a print image setting portion for a user to set an image to be printed on each of the print surfaces, and a reception unit that receives an operation by the user via an input device, wherein the controller changes the number of the print image setting portions to be displayed on the display device according to the workpiece information.

According to another aspect of the present disclosure, a three-dimensional object printing apparatus includes the print control device described above and a head that ejects a liquid based on control of the print control device.

According to still another aspect of the present disclosure, a print control method of controlling printing on a three-dimensional workpiece includes a first step of acquiring workpiece information including information about the number of print surfaces of the workpiece, where an image is printed on each of the print surfaces, and a second step of displaying, on a display device, a print image setting portion for a user to set an image to be printed on each of the print surfaces, wherein the number of the print image setting portions displayed in the second step is changed according to the workpiece information selected in the first step.

According to still another aspect of the present disclosure, in a non-transitory computer-readable storage medium storing a computer program for controlling printing on a three-dimensional workpiece, the computer program causes a computer to execute an acquisition function of acquiring workpiece information including information about the number of print surfaces of the workpiece, where an image is printed on each of the print surfaces, a control function of displaying, on a display device, a print image setting portion for a user to set an image to be printed on each of the print surfaces, and a reception function of receiving an operation by the user via an input device, wherein the control function changes the number of the print image setting portions to be displayed on the display device according to the workpiece information.

DESCRIPTION OF EXEMPLARY EMBODIMENTS

1. Configuration of Three-Dimensional Object Printing System

Figure 1:
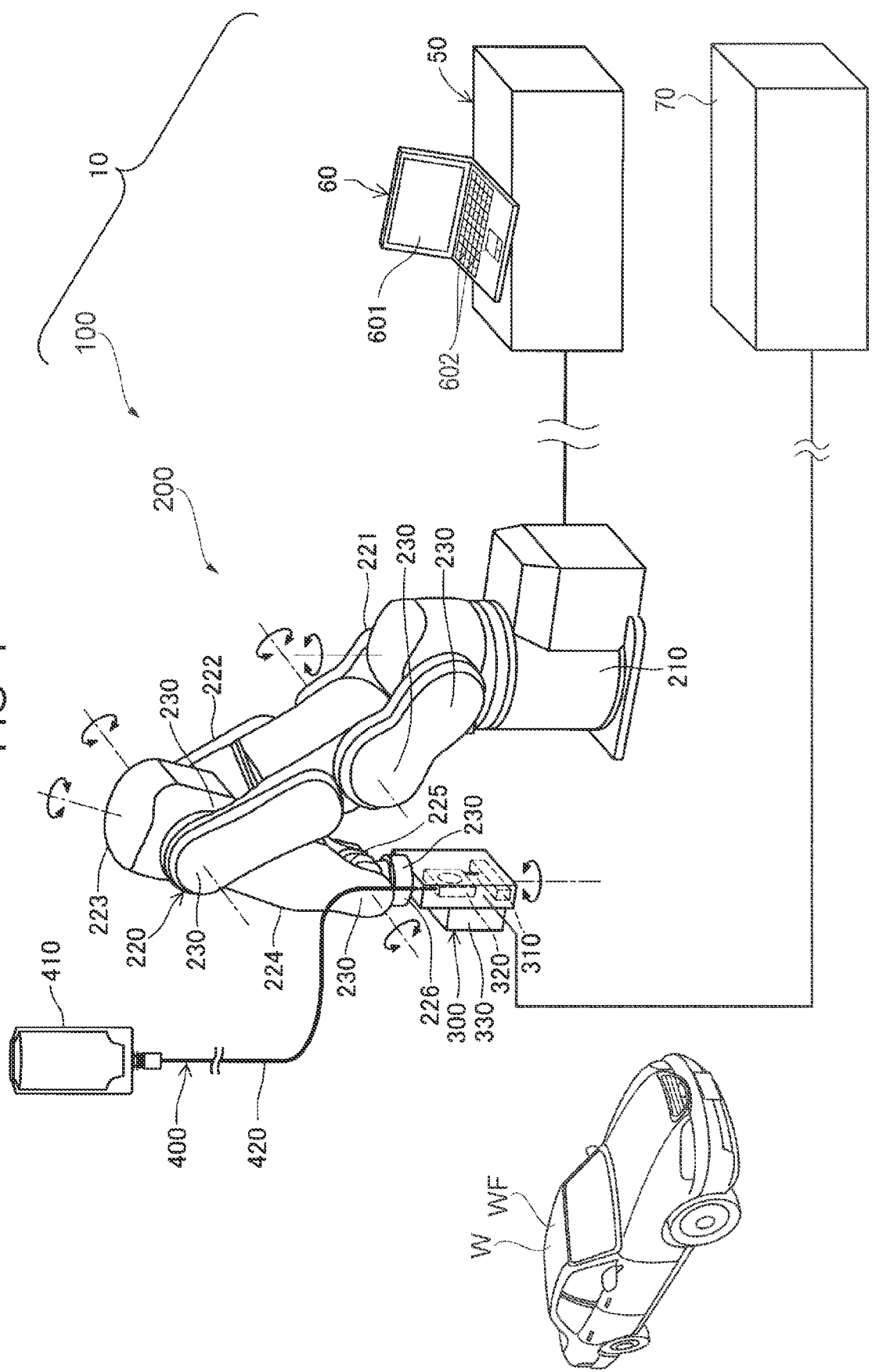
FIG. 1 is a perspective view showing an outline of a three-dimensional object printing system.

FIG. 1 is a perspective view showing an outline of a three-dimensional object printing system 10 according to an embodiment of the present disclosure. The three-dimensional object printing system 10 includes a three-dimensional object printing apparatus 100 including a robot 200 and a head unit 300, a robot control device 50, a print control device 60, and a head unit control device 70. The three-dimensional object printing apparatus 100 is connected to the robot control device 50 and the head unit control device 70 by wire or wirelessly. Similarly, the print control device 60 is coupled to the robot control device 50 and the head unit control device 70 by wire or wirelessly.

The three-dimensional object printing apparatus 100 is an apparatus that uses a vertical articulated robot to form an image as a formed object on the surface of a three-dimensional workpiece W by ink jet printing. The robot control device 50 controls the motion of the robot 200. The head unit control device 70 controls the operation of the head unit 300. The print control device 60 is a device for controlling the robot control device 50 and the head unit control device 70, and is, for example, a personal computer.

Each part of the three-dimensional object printing apparatus 100 shown in FIG. 1 will be described below. In the present embodiment, the configuration, functions, and control of the three-dimensional object printing apparatus 100 will be mainly described, but the configuration, functions, and control of the three-dimensional object printing apparatus 100 can be also applied to the print control method and the computer program.

1-1. Robot

The robot 200 is a movement mechanism that changes the position and the attitude of the head unit 300 with respect to the workpiece W. In the example shown in FIG. 1, the robot 200 is a so-called 6-axis vertical articulated robot. The robot 200 has a base 210 and an arm 220.

The base 210 is a platform that supports the arm 220. In the example shown in FIG. 1, the base 210 is fixed by screws or the like to an installation surface such as a floor facing upward. The installation surface to which the base 210 is fixed may be a face facing any direction, such as a wall, a ceiling, or a face of a movable cart.

The arm 220 is a 6-axis robot arm having a proximal end attached to the base 210 and a distal end that changes its position and posture three-dimensionally with respect to the proximal end. Specifically, the arm 220 has arms 221, 222, 223, 224, 225, and 226 that are coupled to each other in this order by a plurality of respective rotatable joints 230. The head unit 300 as an end effector is attached to the distal end of the arm 220, that is, the arm 226. Here, at least some of the joints 230 have different rotation axis directions, so that the robot 200 can freely change the position and the attitude of the head unit 300 by rotating the respective joints 230.

1-2. Head Unit

The head unit 300 includes a head 310 that ejects an ink, which is an example of a liquid, toward the workpiece W, an energy emitting unit 330 that cures or solidifies the ink ejected onto the workpiece W from the head 310, and a pressure regulating valve 320 that regulates the pressure of the ink to be supplied to the head 310. Since each of these components 310, 320, 330 is fixed to the arm 226, the positions and the attitudes thereof relative to each other are fixed.

The ink ejected by the head 310 is not particularly limited, and examples thereof may include a water-based ink obtained by dissolving a color material such as a dye or pigment in a water-based solvent, a curable ink including a curable resin such as an ultraviolet curable resin, and a solvent-based ink in which a color material such as a dye or a pigment is dissolved in an organic solvent. Among them, curable ink is preferably used. The curable ink is not particularly limited, and may be any of thermosetting, photo-curing, radiation-curing and electron beam-curing types, but the curable ink of the photo-curing type such as a UV-curing type is preferred. The ink is not limited to a solution, and may be an ink in which a color material or the like as a dispersoid is dispersed in a dispersion medium. In addition, the ink is not limited to an ink containing a color material, and may be an ink containing conductive particles, as a dispersoid, such as metal particles for forming wiring or the like.

Although not shown in FIG. 1, the head 310 has an energy generating element that generates energy for applying pressure to the liquid, a cavity (pressure chamber) that stores the ink, and nozzles that communicate with the cavity. Here, a piezoelectric element is used as the energy generating element. However, a heat generating element may be used as the energy generating element. Here, the piezoelectric element is provided for each cavity, and the piezoelectric element undergoes bending vibration when a signal for ejecting the ink is supplied to the piezoelectric element. As a result, the pressure in the cavity changes, and the ink is ejected from the nozzle of the head 310 corresponding to the cavity.

The pressure regulating valve 320 is a valve mechanism that opens/closes according to the pressure of the ink inside the head 310. By this opening/closing, the pressure of the ink inside the head 310 is maintained at a negative pressure within a predetermined range. Therefore, the ink meniscus formed in the nozzle of the head 310 is stabilized.

The energy emitting unit 330 emits energy such as light, heat, electron beams, or radiation depending on the type of the ink. For example, when the ink is UV curable, the energy is UV. The energy emitting unit 330 has a configuration according to the type of energy. For example, when the energy is ultraviolet rays, the energy emitting unit 330 includes a light source such as a light emitting element such as a light emitting diode (LED) that emits ultraviolet rays. In addition, it is preferable that the energy emitting unit 330 can adjust the intensity of the energy to be emitted. In addition, the energy emitting unit 330 may further include an optical component such as a lens for adjusting the energy emitting direction or the energy emitting range. Hereinafter, a face formed by a portion, of the energy emitting unit 330, from which energy is emitted will be referred to as an emission face.

1-3. Ink Supply Unit

An ink supply unit 400 is a mechanism for supplying the ink to the head 310. The ink supply unit 400 includes an ink reservoir 410 and a supply flow path 420.

The ink reservoir 410 is a container that stores the ink as a liquid. The ink reservoir 410 is, for example, a bag-like ink pack made of flexible film.

The ink reservoir 410 is fixed to a wall, a ceiling, a pillar, or the like so that it is always positioned above the head 310 in the vertical direction. Therefore, the ink can be supplied from the ink reservoir 410 to the head 310 with a predetermined pressurizing force without using a mechanism such as a pump.

The supply flow path 420 is a flow path through which the ink is supplied from the ink reservoir 410 to the head 310. The pressure regulating valve 320 described above is provided in the middle of the supply flow path 420. Therefore, even when the positional relationship between the head 310 and the ink reservoir 410 changes, the pressure fluctuation of the ink inside the head 310 can be reduced.

1-4. Various Control Devices

Figure 2:
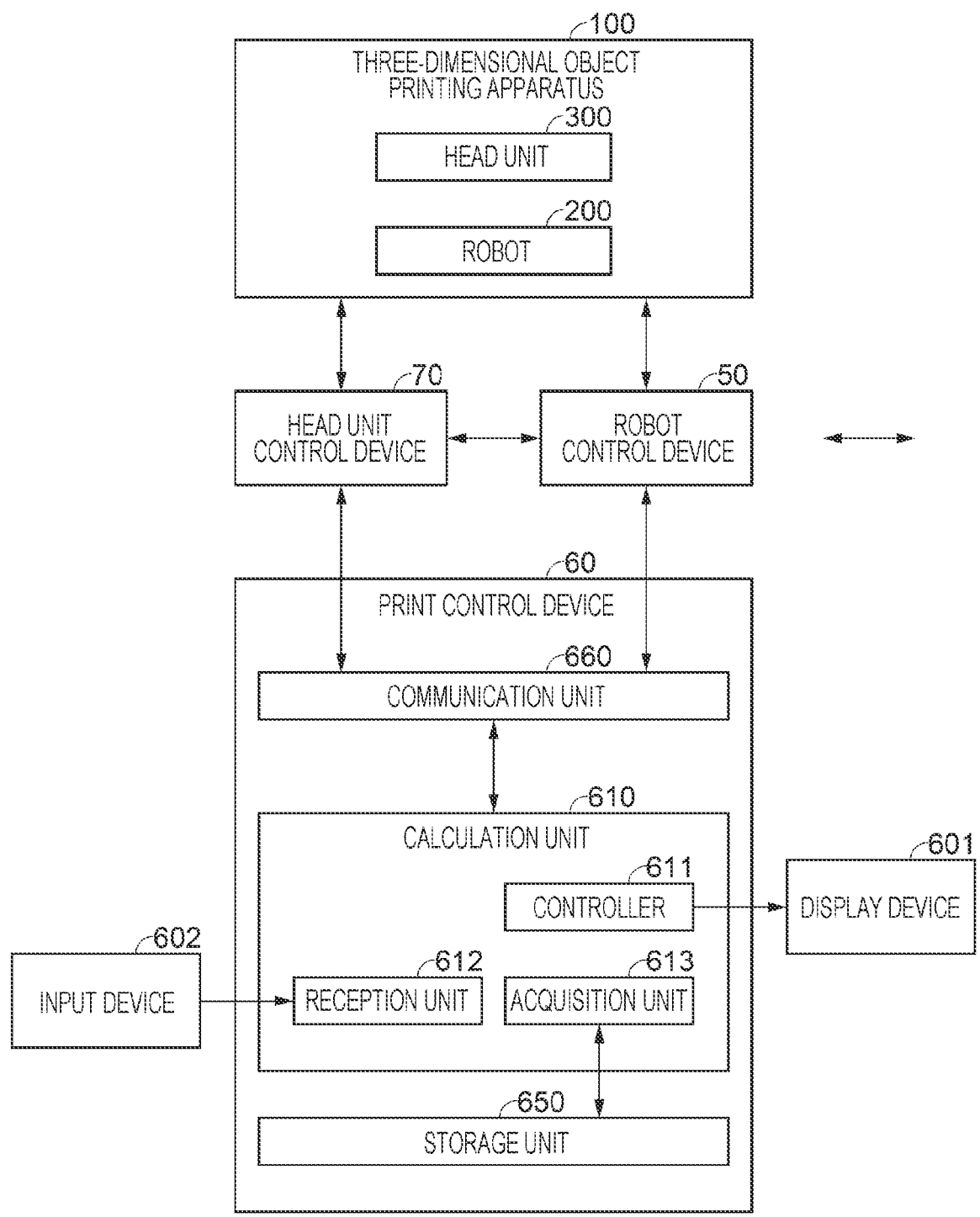
FIG. 2 is a block diagram showing the relationship between a print control device, a robot control device, and a head unit control device.

FIG. 2 is a block diagram showing the relationship between the print control device 60, the robot control device 50, and the head unit control device 70. The robot control device 50 is a device that controls the motion of the robot 200, and specifically controls the rotation angle of the joint 230. The robot control device 50 outputs information about the position of the head unit 300 to the head unit control device 70.

The head unit control device 70 is a device that controls the head unit 300, and specifically controls the ink ejection by the head 310 and energy emission by the energy emitting unit 330. Also, based on the information about the position of the head unit 300 input from the robot control device 50, the head unit control device 70 adjusts the ink ejection timing. In other words, the head unit control device 70 has a function of synchronizing the ejection operation of the head 310 with the motion of the robot 200.

The print control device 60 is a device that controls the robot control device 50 and the head unit control device 70 according to the user's operation, and is a notebook personal computer including a display device 601, an input device 602, a calculation unit 610, a storage unit 650, and a communication unit 660 in the present embodiment. Here, at least some of the functions performed by the print control device 60 may be incorporated as part of the robot control device 50 or may be incorporated as part of the head unit control device 70.

The display device 601 includes a liquid crystal display provided in a notebook personal computer, and displays information required for user's operation. The input device 602 includes a keyboard and a touch pad provided in the notebook personal computer, and the user operates the print control device 60 using these.

The communication unit 660 performs data communication with external devices such as the robot control device 50 and the head unit control device 70. The storage unit 650 includes memories such as a random access memory (RAM) and a read only memory (ROM), and storage devices such as a hard disk drive (HDD) and a solid state drive (SSD). The storage unit 650 stores various computer programs for controlling the operation of the print control device 60, various pieces of data, and the like. The storage unit 650 of the present embodiment stores a print control program (not shown) for performing various settings and control related to printing.

The calculation unit 610 is configured by a central processing unit (CPU) and includes one or more controllers 611, one or more reception units 612, and one or more acquisition units 613. Each of the controller 611, the reception unit 612 and the acquisition unit 613 functions by developing various computer programs stored in the storage unit 650. At least some of the functions of the calculation unit 610 may be configured by a hardware circuit.

The controller 611 generates a screen for the user to issue an instruction and displays the screen on the display device 601. The user uses the input device 602 to input the instruction to the print control device 60 while viewing the screen displayed on the display device 601. The controller 611 acquires the instruction through the reception unit 612, makes various determinations, and transmits the instruction to the robot control device 50 and the head unit control device 70 through the communication unit 660. Also, the controller 611 transmits information to be acquired to the acquisition unit 613. The function of the controller 611 as described above is an example of the control function.

The reception unit 612 receives an operation by the user via the input device 602. For example, the reception unit 612 accepts input of a character string or selection of an image performed by the user pressing a keyboard or touching a touch pad as a user operation to transmit the operation to the controller 611. The function of the reception unit 612 as described above is an example of a reception function.

The acquisition unit 613 receives an instruction from the controller 611 and acquires information such as various computer programs and various pieces of data stored in the storage unit 650. The function of the acquisition unit 613 as described above is an example of an acquisition function.

In the present embodiment, since the print control device 60 is a notebook personal computer, the display device 601 and the input device 602 are integrally provided as components of the print control device 60. However, the disclosure is not limited to this. The display device 601 and the print control device 60 may be configured separately and may communicate with each other by wire or wirelessly. Coupling a separate display to a personal computer is an example of such a case. Similarly, the input device 602 and the print control device 60 may be separately configured and may communicate with each other by wire or wirelessly. Coupling a separate mouse and a separate keyboard to a personal computer is an example of such a case. Note that the display device 601 may have a function as the input device 602 in addition to the function of displaying visual information to the user. That is, the display device 601 and the input device 602 may be integrally provided by simultaneously having a function of displaying information and a function of receiving instructions from the user, like a display with a touch sensor. Using a smartphone or a tablet terminal as the print control device 60 is an example of such a case.

1-5. Outline of Printing Process

Figure 3:
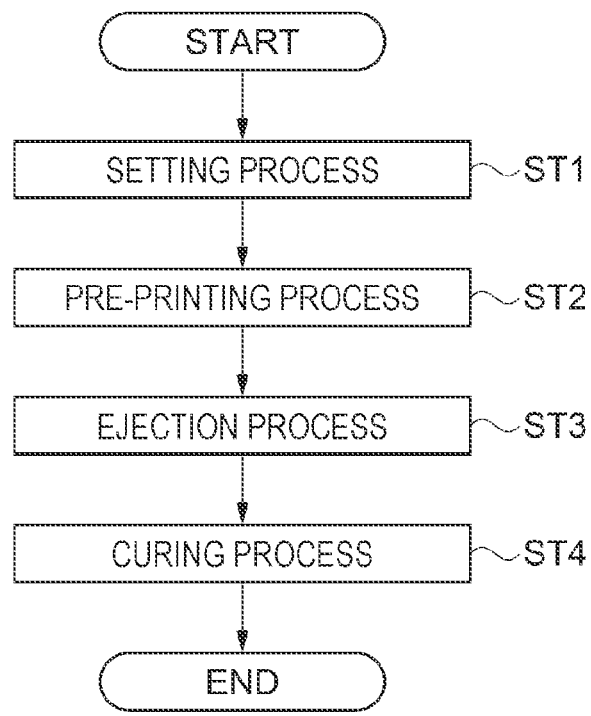
FIG. 3 is a flowchart showing an outline of a printing process.

Next, an outline of a printing process for printing an image, using the three-dimensional object printing system 10, on the workpiece W that is a three-dimensional structure composed of a plurality of flat faces and a plurality of curved faces, will be described. FIG. 3 is a flowchart showing the printing process. The printing process of the present embodiment includes a setting process ST1 for making various settings related to printing, a pre-printing process ST2 for setting the scanning path of the robot 200, an ejection process ST3 for performing an ink ejection operation on the workpiece W by the head 310, and a curing process ST4 for performing, by the energy emitting unit 330, a curing operation of irradiating the ink that has landed on the workpiece W with energy.

When the print control device 60 receives a user's operation to activate the print control program via the reception unit 612, the setting process ST1 is executed. Details of the setting process ST1 will be described later. After that, when the print control device 60 receives an instruction to start printing from the user via the reception unit 612, the pre-printing process ST2 is executed. In the pre-printing process ST2, the robot control device 50 first determines the scanning path to be scanned by the head unit 300 based on the three-dimensional shape information indicating the position and the shape of the workpiece W. At this time, the three-dimensional shape information may be stored in advance in the robot control device 50 or the print control device 60, or may be information recognized by a camera or a sensor provided in the three-dimensional object printing apparatus 100.

In the ejection process ST3, while the head unit 300 is moving along the scanning path under the control of the robot control device 50, the head 310 ejects the ink toward a print surface WF of the workpiece W under the control of the head unit control device 70. Here, the print surface WF is a face on which an image is printed, and is set for the surface of the workpiece W. The print surface WF is appropriately set according to the shape of the workpiece W and the user's selection, and the number of the print surface WF is not limited to one or two, but may be three or more, and is not particularly limited.

In the curing process ST4, while the head unit 300 is moving along the scanning path under the control of the robot control device 50, the energy emitting unit 330 emits energy toward the ink that has landed on the print surface WF under the control of the head unit control device 70, so that the ink is cured or solidified.

Note that, in the setting process ST1, it is desirable to display a screen for print control so that the image candidate to be printed can be displayed in advance so as to be visually recognized in the preview, and the user can individually set the print setting on the image to be printed for each print surface WF and to improve user convenience. However, for the surface of one workpiece W, the print surface WF to be printed is set according to the shape of the workpiece W and the user's selection, as described above, so that the number thereof changes. Therefore, the number of previews and print settings required also changes. For this reason, it is difficult to apply a technique for the preview and the print setting that has been used for performing printing on sheet-like print medium such as a paper to the three-dimensional object printing apparatus 100.

Therefore, in the print control device 60 that is used to print an image on the workpiece W, the present disclosure provides a technique that is highly convenient for the user. The processing content of the print control device 60 and the display mode of the print control screen displayed on the display device 601 according to the embodiment of the present disclosure will be described below.

2. Contents of Control of Print Control Device and Display Mode of Print Control Screen Based on the apparatus configuration described above, the modes of display and input controlled by the print control device 60 in the three-dimensional object printing system 10 will be described.

Figure 4:
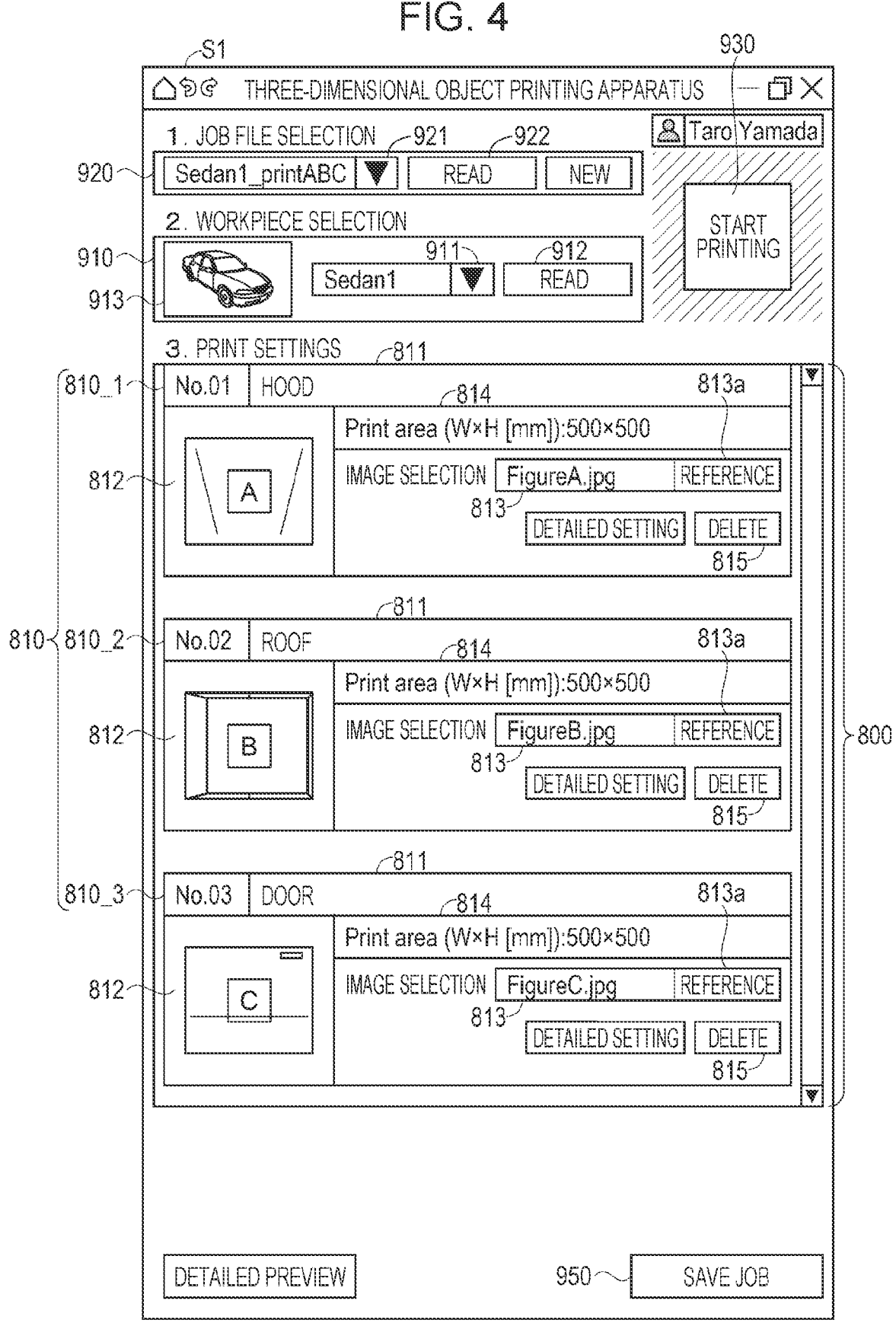
FIG. 4 is a diagram showing an example of a print control screen.

FIG. 4 is a diagram showing an example of a print control screen S1 displayed on the display device 601 in the setting process ST1. When the print control program is activated by the user's operation, the controller 611 displays the print control screen S1 on the display device 601, thereby starting the setting process ST1. The print control screen S1 includes a job selection region 920, a workpiece selection region 910 displayed below the job selection region 920, and a print image setting region 800 displayed below the workpiece selection region 910. The print control screen S1 also includes a print start button 930 and a job save button 950. The display positions of the regions 910, 920, 800 and the buttons 930, 950 are not limited to the positions shown in the figure. However, the display position of the print image setting region 800 in the print control screen S1 is preferably below the workpiece selection region 910 from the user's point of view. This is because the workpiece W to be printed is first identified in the workpiece selection region 910, and then the image to be printed is set in the print image setting region 800.

Note that the regions 910, 920, and 800 do not necessarily have to be displayed within one print control screen S1. For example, the job selection region 920 and the workpiece selection region 910 may be displayed in one print control screen, and the print image setting region 800 may be displayed in another print control screen. Also, the regions 910, 920, 800 and the buttons 930, 950 do not necessarily have to be displayed simultaneously on the display device 601.

2-1. Job Selection

The job selection region 920 is a screen for the user to select a job file, and is displayed as part of the print control screen S1. Here, a job file is a file in which information about a combination of the workpiece W and an image to be printed on each print surface WF of the workpiece W is stored. An outline of the job file will be described with reference to FIG. 4 and FIG. 5.

Figure 5:
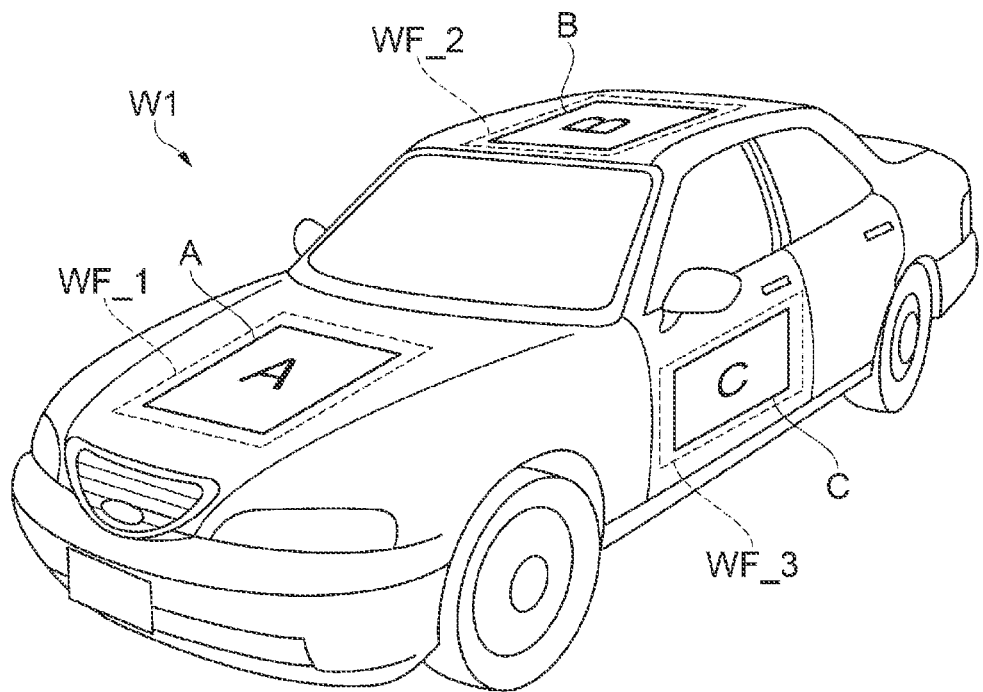
FIG. 5 is a diagram showing an example of a workpiece.

FIG. 5 shows a workpiece W1, which is an example of the workpiece W of the present embodiment. The workpiece W1 is a sedan-type passenger car, and a plurality of print surfaces WF is set on the surface of the workpiece W1. The print surface WF of the workpiece W1 includes print surfaces WF_1 to WF_3, which are shown surrounded by dashed lines in FIG. 5. The print surface WF_1 is a region set on a portion of the hood, which is one of the components of the workpiece W1, and an image A is printed thereon. The print surface WF_2 is a region set on a portion of the roof, which is one of the components of the workpiece W1, and an image B is printed thereon. The print surface WF_3 is a region set on part of the door, which is one of the constituent elements of the workpiece W1, and an image C is printed thereon. The job file stores information that associates the print surfaces WF of the workpiece W with images to be printed on respective print surfaces WF as described above. In other words, the job file stores information about a combination of printing the image A on the print surface WF_1, printing the image B on the print surface WF_2, and printing the image C on the print surface WF_3 of the workpiece W1. Note that the job file is only required to contain information about the combination, and does not need to contain the shape and dimensions of the workpiece W and the data of the image to be printed. An individual job file is created for each different combination of the print surface WF of the workpiece W and the image to be printed, and stored in the storage unit 650 in advance. Details regarding the creation and storage of the job file are provided below.

In the example shown in FIG. 4, the job selection region 920 is composed of a pull-down menu. When the user presses a pull-down button 921, a plurality of job files stored in the storage unit 650 is displayed in a pull-down menu, and the user can select one of the job files displayed in the pull-down menu. Such selection by the user is implemented by, for example, an operation by the user moving a cursor displayed on the display device 601 using a touch pad, which is an example of the input device 602. Note that the job selection region 920 may not be a pull-down menu, but may be a text box into which the file name of the job file can be entered. Furthermore, it may be a combo box that combines a pull-down menu and a text box.

After that, when the user presses the job file read button 922, the selected job file is selected, and the content of the job file is reflected in the workpiece selection region 910 and the print image setting region 800. In other words, by selecting a job file, the setting content of the workpiece selection region 910 and the print image setting region 800 are provisionally input. The user can start printing in this state, but can also change the setting content of the workpiece selection region 910 and the print image setting region 800 as necessary. FIG. 4 shows an example in which "Sedan1_printABC" is selected as a job file and read. Note that selection of a job file in the job selection region 920 is not essential, but the user can directly select the workpiece W and set the print image, which will be described later, in the workpiece selection region 910 and the print image setting region 800.

2-2. Workpiece Selection

The workpiece selection region 910 is a screen for the user to select the workpiece W, which is an object to be printed, and is displayed as part of the print control screen S1. In the example shown in FIG. 4, the workpiece selection region 910 is composed of a pull-down menu. When the user presses a pull-down button 911, the names of selectable workpieces W are displayed in a pull-down menu, and the user can select one of the workpieces W displayed in the pull-down menu. Note that the workpiece selection region 910 is an example of a workpiece information selection portion.

In FIG. 4, since "Sedan1_printABC" is selected as the job file, "Sedan1" is displayed in the workpiece selection region 910 as the workpiece W corresponding to the job file. However, the user can directly select the workpiece W or change the selection of the workpiece W from the pull-down menu without selecting the job file. In this case, when the user selects the workpiece W from the pull-down menu and then presses a read workpiece information button 912, workpiece information, which is information about the workpiece W, is acquired from the storage unit 650 and reflected in the print image setting region 800. The workpiece selection region 910 may include a workpiece preview portion 913 in which an image of the workpiece W is displayed so that the user can easily recognize the type of workpiece W selected.

Workpiece information will now be described. Table 1 shows workpiece information about the workpiece W1, which is an example of the workpiece W. The workpiece information includes the name of the workpiece W, the number of the print surfaces WF on the workpiece W, the name of the print surface WF, the size of the print surface WF, and the like, and is stored in the storage unit 650 as a workpiece information file. The storage unit 650 stores a plurality of pieces of workpiece information, and the pull-down menu of the workpiece selection region 910 described above displays the names of the workpieces W included in the plurality of pieces of workpiece information.

In the example of Table 1, the name (Name) of the workpiece W1 is "Sedan1", and the number of the print surfaces WF (Area_num) on the workpiece W is three. The names of the three print surfaces WF_1 to WF_3 (Area1_Title to Area3_Title) are "hood", "roof", and "door", respectively, and the sizes of respective print surfaces WF (Area1_WH to Area3_WH) are all 500 [mm]×500 [mm].

TABLE 1

| Name | Sedan1 | |
|---|---|---|
| Area_num | 3 | |
| Area1_Title | Hood | |
| Area1_WH | 500 | 500 |
| Area2_Title | Roof | |
| Area2_WH | 500 | 500 |
| Area3_Title | Door | |
| Area3_WH | 500 | 500 |

The workpiece information is not limited to the above example, and may include other information such as information about the shape of the workpiece, information about the scanning path of the robot 200, and the like. The controller 611 displays the workpiece selection region 910 on the display device 601, and the user performs an operation of selecting the workpiece W using the input device 602 while viewing the workpiece selection region 910. The reception unit 612 receives this operation, and the acquisition unit 613 acquires the workpiece information about the workpiece W selected by the user from the storage unit 650. Then, a controller 611 determines the display content of the print image setting region 800 based on the workpiece information acquired by the acquisition unit 613. Selecting a workpiece W in the workpiece selection region 910 is synonymous with selecting workpiece information corresponding thereto. Also, the process in which the acquisition unit 613 acquires the workpiece information from the storage unit 650 is an example of a first step.

2-3. Print Image Setting

After selecting the workpiece W, the user individually sets the image to be printed on each print surface WF. The print image setting region 800 is a screen for the user to set an image to be printed on each print surface WF on the workpiece W, and is displayed as part of the print control screen S1. The print image setting region 800 includes at least one print image setting portion 810. A print image setting portion 810 is provided for the user to set an image to be printed for each print surface WF, and includes a name display portion 811, a preview portion 812, a print image selection portion 813, and a size display portion 814, and a delete button 815.

In the example of FIG. 4, the number of print image setting portions 810 included in the print image setting region 800 is three. This is the result of reflecting in the print image setting region 800 the aforementioned workpiece information that the number of the print surfaces WF on the workpiece W is three. That is, the controller 611 changes the number of print image setting portions 810 displayed on the display device 601 according to the workpiece information about the workpiece W selected by the user. Here, the process in which the controller 611 displays the print image setting portion 810 on the display device 601 is an example of a second step. When distinguishing between the three print image setting portions 810, they are referred to as print image setting portions 810_1, 810_2, and 810_3 below.

The name display portion 811 is a portion for displaying the name of the print surface WF that is a surface to be set in the print image setting portion 810. The name of the print surface WF is displayed based on the workpiece information corresponding to the workpiece W selected in the workpiece selection region 910. For example, the name of the print surface WF_1 displayed in the name display portion 811 of the print image setting portion 810_1 is "hood", and the name of the print surface WF_2 displayed in the name display portion 811 of the print image setting portion 810_2 is "roof", and the name of the print surface WF_3 displayed in the name display portion 811 of the print image setting portion 810_3 is "door". That is, the controller 611 displays the name of the print surface WF for each print image setting portion 810 based on the workpiece information corresponding to the workpiece W selected by the user.

The size display portion 814 is a portion that displays the size of the print surface WF, and is displayed based on the workpiece information corresponding to the workpiece W selected in the workpiece selection region 910. For example, the size of the print surface WF_1 displayed in the size display portion 814 of the print image setting portion 810_1 is "500×500", the size of the print surface WF_2 displayed in the size display portion 814 of the print image setting portion 810_2 is "500×500", and the size of the print surface WF_3 displayed in the size display portion 814 of the print image setting portion 810_3 is "500×500".

The print image selection portion 813 is a portion for the user to select an image to be printed on the print surface WF. In the example shown in FIG. 4, the print image selection portion 813 includes a reference button 813a. When the user presses the reference button 813a, a screen displaying a list of file names of a plurality of images or a plurality of thumbnail images as candidates of images to be printed is displayed, and the user can select a desired image. An operation of selecting an image by the user is received by the reception unit 612. As another example, the print image selection portion 813 may be configured by a pull-down menu. In this case, when the user presses the pull-down button, a plurality of selectable images is displayed in a pull-down menu, and the user can select one of the images displayed in the pull-down menu. Candidates of images to be printed are stored in the storage unit 650 as image files, and are acquired by the acquisition unit 613 based on user selection. Further, as described above, since the controller 611 changes the number of the print image setting portions 810 according to the workpiece information about the workpiece W selected by the user, it can be said that the number of the print image selection portions 813 included in the print image setting portion 810 is also changed according to the workpiece information about the workpiece W.

Figure 6:
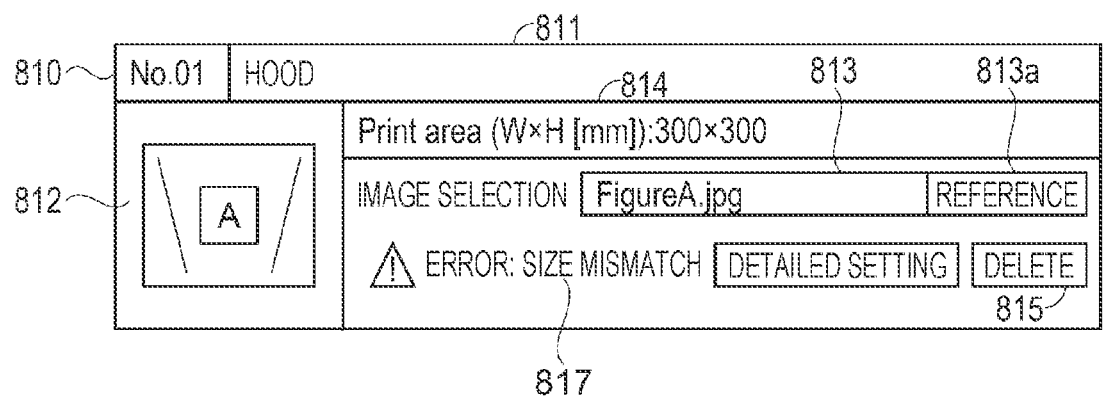
FIG. 6 is a diagram showing an example of an error message.

Here, when an image is selected by the user, the controller 611 compares the size of the image selected by the user with the size of the print surface WF included in the workpiece information described above. When the size of the image selected by the user is larger than the size of the print surface WF, the user is notified of an error message 817 that is to be displayed in the print image setting portion 810. FIG. 6 shows an example of the error message 817 displayed in the print image setting portion 810. Note that the wording of the error message 817 is not particularly limited. Further, the position where the error message 817 is displayed is not limited to that of the print image setting portion 810 as long as it is within the print control screen S1.

The preview portion 812 displays a candidate of an image to be printed on the print surface WF so that the user can visually recognize them. The image displayed in the preview portion 812 is an image selected by the user using the print image selection portion 813 or a thumbnail image of the image. In the example of FIG. 4, part of the component including the print surface WF of the workpiece W1 and an image candidate is displayed in an overlapping manner. For example, in the preview portion 812 of the print image setting portion 810_1, a state in which the image A is printed on the hood, which is one of the constituent elements of the workpiece W1 including the print surface WF_1 is virtually displayed, so that the user can visually recognize the state. Note that the mode of the preview portion 812 is not limited to this example, and an image selected by the user may be simply displayed, or the entire workpiece W instead of only part of the constituent element of the workpiece W may be displayed. When the user performs an operation of selecting an image using the input device 602, the reception unit 612 receives this operation, and the controller 611 updates the display of each of the preview portion 812 and the print image selection portion 813. Further, as described above, since the controller 611 changes the number of the print image setting portions 810 according to the workpiece information about the workpiece W selected by the user, it can be said that the number of the preview portions 812 included in the print image setting portion 810 is also changed according to the workpiece information about the workpiece W.

The delete button 815 is used to delete the setting displayed in the print image setting portion 810 so that printing is not performed on a specific print surface WF. For example, when performing printing on the roof is unnecessary, the display of the print image setting portion 810_2 is deleted from the print image setting region 800 by the user pressing the delete button 815 of the print image setting portion 810_2. In this case, even when the print start button 930 is pressed, the print surface WF_2 is not printed.

2-4. Printing and Saving Job File

When the user presses the print start button 930, the pre-printing process ST2, the ejection process ST3, and the curing process ST4 are executed. More specifically, the print control device 60 instructs the head unit control device 70 and the robot control device 50 to start printing based on the information set by the user in the print control screen S1. In response to this, the head unit control device 70 causes the head unit 300 to print the set image. Also, the robot control device 50 determines a scanning path so that the head unit 300 can print the set image, and causes the robot 200 to move the head unit 300 along the scanning path. That is, the three-dimensional object printing apparatus 100 performs printing according to the combination of the print surface WF and the image set by the user in the print image setting region 800. Therefore, the image A is printed on the print surface WF_1 set for the hood of the workpiece W1, the image B is printed on the print surface WF_2 set for the roof of the workpiece W1, and the image C is printed on the print surface WF_3 set for the door of the workpiece W1.

A combination (job) of the workpiece W selected in the workpiece selection region 910 and the image to be printed on the print surface WF selected in the print image setting region 800 can be saved as a job file before and after printing. Specifically, when the job save button 950 is pressed, a screen for creating a job file is displayed, the job file name and the like are set, and the job file is stored in the storage unit 650.

3. Another Example of Display Mode of Print Control Screen

As an example of the workpiece W, the print control screen S1 in the case of performing printing on the workpiece W1, which is a sedan-type passenger car, is described above. A print control screen S2 for a workpiece W2, which is an example of the workpiece W different from the workpiece W1, will be described below.

Figure 7A:
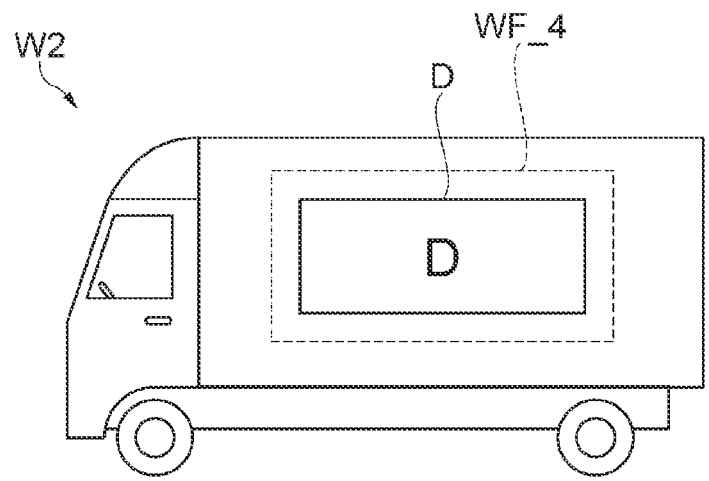
FIG. 7A is a diagram showing an example of a workpiece.
Figure 7B:
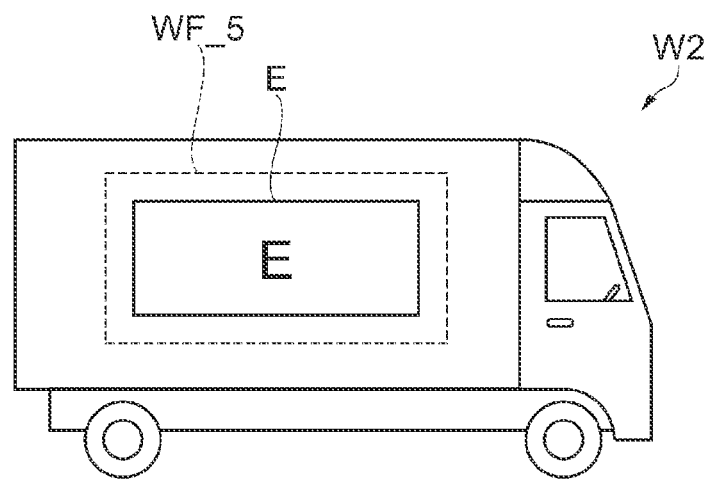
FIG. 7B is a diagram showing an example of a workpiece.

The workpiece W2 is shown in FIGS. 7A and 7B. The workpiece W2 is a track, and two print surfaces WF are set for the workpiece W2. The direction in which the workpiece W2 is viewed is different between FIGS. 7A and 7B. The print surface WF of the workpiece W2 includes a print surface WF_4 and a print surface WF_5, which are shown surrounded by dashed lines in FIGS. 7A and 7B. The print surface WF_4 is a region set on a portion of the loading platform left side face, which is one of the components of the workpiece W2, and an image D is printed thereon. The print surface WF_5 is a region set on a portion of the loading platform right side face, which is one of the components of the workpiece W2, and an image E is printed thereon.

Table 2 shows workpiece information about workpiece W2. The name (Name) of the workpiece W2 is "Truck2", and the number of the print surfaces WF (Area_num) on the workpiece W2 is two. The names (Area1_Title, Area2_Title) of the two print surfaces WF_4 and WF_5 are "loading platform left side face" and "loading platform right side face", respectively, and the sizes of respective print surfaces WF (Area1_WH to Area2_WH) are all 3000 [mm]×800 [mm].

TABLE 2

| Name | Truck2 | |
|---|---|---|
| Area_num | 2 | |
| Area1_Title | Loading platform left side face | |
| Area1_WH | 3000 | 800 |
| Area2_Title | Loading platform right side face | |
| Area2_WH | 3000 | 800 |

Figure 8:
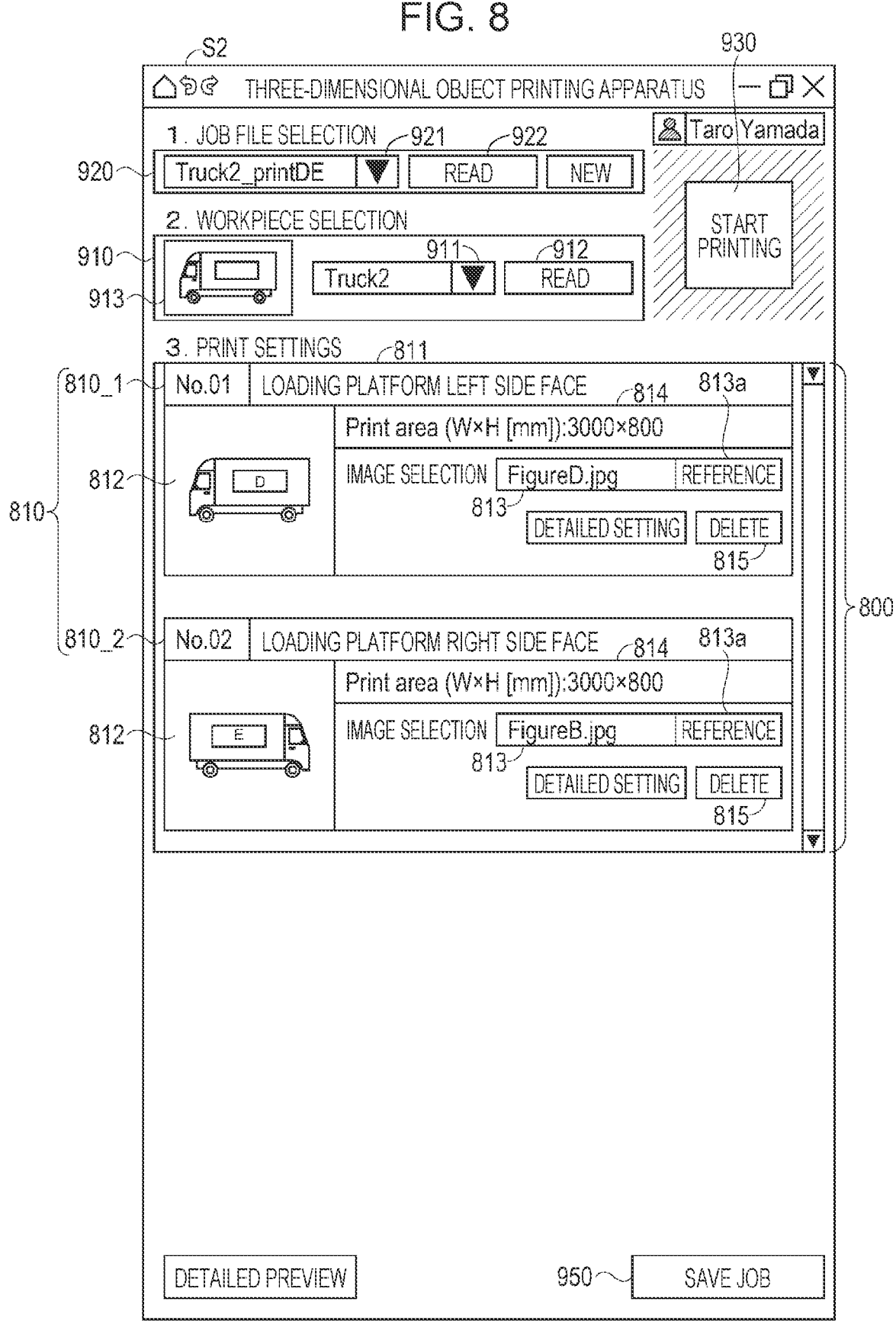
FIG. 8 is a diagram showing an example of a print control screen.

FIG. 8 is a diagram showing an example of the print control screen S2 displayed on the display device 601 when performing printing on the workpiece W2. FIG. 8 shows an example in which "Truck2_printDE" as a job file is selected and read by the operation same as the above-described user operation. Based on the information about the job file, "Truck2", which is the workpiece W2, is selected as the workpiece W in the workpiece selection region 910, and the print image setting region 800 is displayed based on the workpiece information in Table 2. Here, the number of print image setting portions 810 included in the print image setting region 800 is two. This is the result of reflecting in the print image setting region 800 the workpiece information in Table 2 that the number of the print surfaces WF on the workpiece W is two. That is, the number of print image setting portions 810 changes according to the workpiece information. In other words, the controller 611 changes the number of print image setting portions 810 according to the workpiece information about the workpiece W selected by the user. Therefore, the number of the preview portions 812 and the number of the print image selection portions 813 displayed in the print control screen S2 also change according to the workpiece information.

The name display portions 811 of the print image setting portion 810_1 and the print image setting portion 810_2 reflect the names of the print surfaces WF included in the workpiece information, and are displayed as "loading platform left side face" and "loading platform right side face", respectively. That is, the controller 611 displays the name of the print surface WF for each print image setting portion 810 based on the workpiece information corresponding to the workpiece W selected by the user. Therefore, the name of the print surface WF displayed in the name display portion 811 changes according to the workpiece information.

The size display portions 814 of the print image setting portion 810_1 and the print image setting portion 810_2 reflect the sizes of the print surfaces WF included in the workpiece information, and the respective portions display "3000×800". That is, the controller 611 changes the size of the print surface WF displayed on the size display portion 814 according to the workpiece information.

4. Summary of Embodiments

As described above, the print control device 60, the print control method, and the computer program of the present embodiment are used to control printing on the three-dimensional workpiece W. The print control device 60 of the present embodiment includes the acquisition unit 613 that acquires workpiece information including information about the number of the print surfaces WF on which images are printed for the workpiece W, the controller 611 that displays, on the display device 601, the print image setting portion 810 for a user to set an image to be printed for each print surface WF, and the reception unit 612 that receives an operation by the user via the input device 602. The print control method of the present embodiment includes a first step of acquiring workpiece information including information about the number of the print surfaces WF, and a second step of displaying the print image setting portion 810 on the display device 601. The computer program of the present embodiment causes the print control device 60, which is an example of a computer, to execute an acquisition function of acquiring workpiece information including information about the number of the print surfaces WF, a control function of displaying the print image setting portion 810 on the display device 601, and a reception function of receiving an operation by the user via the input device 602. The print control device 60, the print control method, and the computer program of the present embodiment change the number of print image setting portions 810 displayed on the display device 601 according to the acquired workpiece information. According to the print control device 60, the print control method, and the computer program, the number of print image setting portions 810 on which the user makes the print setting changes according to the workpiece information including information about the number of the print surfaces WF. Therefore, it is possible to flexibly cope with a change in the type of workpiece W or a change in the number of the print surfaces WF, thereby improving usability.

When the workpiece information is the first workpiece information, the controller 611 displays the N print image setting portions 810 on the display device 601, and when the workpiece information is the second workpiece information different from the first workpiece information, the controller 611 displays the M print image setting portions 810 on the display device 601, and 2≤N<M. According to the print control device 60, the print control method, and the computer program as described above, it is possible to make the number of the print image setting portions 810 to be displayed more than two in accordance with the workpiece information selected by the user. Note that the workpiece information about the workpiece W1 in the above-described embodiment is an example of the second workpiece information, and in this example, assuming that the number of the print surfaces WF, that is, the number of the print image setting portions 810 is M, M=3. Further, the workpiece information about the workpiece W2 in the above embodiment is an example of the first workpiece information, and in this example, assuming that the number of the print surfaces WF, that is, the number of the print image setting portions 810 is N, N=2. That is, these examples satisfy the relationship of 2≤N<M. Such a configuration does not impose a restriction in which only two surfaces such as the front and back faces of a sheet-like medium are printed, but and is suitable for performing printing on a three-dimensional workpiece W having, for example, three or more surfaces.

The print image setting portion 810 includes the preview portion 812 that allows the user to visually recognize a candidate of an image to be printed on the print surface WF. According to the print control device 60, the print control method, and the computer program as described above, the print image setting portion 810 includes the preview portion 812, so that the number of the displayed preview portions 812 changes according to the workpiece information including information about the number of the print surfaces WF. Therefore, it is possible to improve in seeing the whole images to be printed.

The print image setting portion 810 includes the print image selection portion 813 for the user to select an image to be printed on the print surface WF, and the reception unit 612 receives an operation by the user to select an image to be printed on the print surface WF. According to the print control device 60, the print control method, and the computer program as described above, the print image setting portion 810 includes the print image selection portion 813, so that the number of the displayed print image selection portions 813 changes according to the workpiece information including the information about the number of the print surfaces WF. Therefore, it is possible to improve operability and in seeing the whole images.

The controller 611 displays, on the display device 601, the workpiece selection region 910 for the user to select workpiece information, the reception unit 612 receives an operation for selecting workpiece information from the user, and the acquisition unit 613 acquires workpiece information based on the selection of the workpiece information received by the reception unit 612. According to the print control device 60, the print control method, and the computer program as described above, the user can select any workpiece information using the workpiece selection region 910, so that it is possible to flexibly change the type of the workpiece W.

The workpiece information includes information about the name of the print surface WF. According to the print control device 60, the print control method, and the computer program as described above, the name of the print surface can be displayed on the print image setting portion 810 or the like based on the workpiece information, thereby improving usability. Such an effect is remarkable when performing printing on the three-dimensional workpiece W having three or more surfaces, for example. This is because the user may have difficulties in recognizing faces when respective faces are expressed by generic names such as the front side and the back side in three-dimensional workpiece W while the user can easily recognize faces of a sheet-like medium because it has only two sides, the front side and the back side.

The controller 611 causes the print image setting portion 810 to display the name of the print surface WF in association with the workpiece information. According to the print control device 60, the print control method, and the computer program as described above, the name of the print surface WF displayed changes based on the workpiece information, so that it is possible to display the name of the print surface WF suitable for the type of the workpiece W. Therefore, it is easier for the user to recognize the print surface WF to be set for each print image setting portion 810, thereby improving usability. Such an effect is remarkable when performing printing on the three-dimensional workpiece W having three or more surfaces, for example. This is because the user may have difficulties in recognizing faces when respective faces are expressed by generic names such as the front side and the back side in three-dimensional workpiece W while the user can easily recognize faces of a sheet-like medium because it has only two sides, the front side and the back side.

The workpiece information includes information about the size of the print surface WF. According to the print control device 60, the print control method, and the computer program as described above, based on the information indicating the size of the print surface WF included in the workpiece information, it is possible to determine the size of the image applicable to the print surface WF, display a preview image reflecting the size on the preview portion 812, and the like, thereby improving usability.

The print image setting portion 810 includes the print image selection portion 813 for the user to select an image to be printed on the print surface WF, the reception unit 612 receives from the user an operation of selecting an image to be printed on the print surface WF, and when the controller 611 determines that the size of the image selected by the user using the print image selection portion 813 is larger than the size of the print surface WF included in the workpiece information, the controller 611 displays the error message 817 on the display device 601. According to the print control device 60, the print control method, and the computer program as described above, when it is determined that the size of the image selected by the user is larger than the size of the corresponding print surface WF, the error message 817 is displayed on the display device 601, so that it is possible to prevent printing from performed beyond the print surface WF set in the workpiece information.

The print control device 60 and the computer program described above may be components of the three-dimensional object printing apparatus 100. According to such a three-dimensional object printing apparatus 100, it is possible to flexibly cope with a change in the type of workpiece W or a change in the number of the print surfaces WF, thereby improving usability.

5. Modifications

In the above embodiment, the three-dimensional object printing apparatus 100 having the head unit 300 attached, as an end effector, to the distal end of the arm 220 of the robot 200 is used to perform printing on the workpiece W mounted nearby, but the configuration of the three-dimensional object printing apparatus 100 is not necessarily limited to this. For example, the workpiece W may be in a state where its position and orientation can be changed by rotation or the like, or may be fixed by some jig or the like. Also, the head unit 300 does not necessarily have to be changed in position and posture by the robot 200. In this case, while the head unit 300 is fixed to a pedestal fixed to the floor, ceiling, wall, and the like, a hand as an end effector is attached to the distal end of the arm 220 of the articulated robot, and the workpiece W may be grasped by the hand, and may be scanned in the vicinity of the fixed head unit 300.

What is claimed is:
1. A print control device used to control printing on a three-dimensional workpiece, the print control device comprising:
an acquisition unit that acquires workpiece information including information about the number of print surfaces of the workpiece, an image being printed on each of the print surfaces;
a controller that displays, on a display device, a print image setting portion for a user to set an image to be printed on each of the print surfaces; and
a reception unit that receives an operation by the user via an input device, wherein
the controller changes the number of the print image setting portions to be displayed on the display device according to the workpiece information including type of the three-dimensional workpiece, and
the controller displays, on the display device, the N print image setting portions when the workpiece information is first workpiece information including first type of workpiece, and displays, on the display device, the M print image setting portions when the workpiece information is second workpiece information that is different from the first workpiece information and includes second type of workpiece.

2. The print control device of claim 1, wherein $2 \leq N < M$.

3. The print control device of claim 1, wherein
the print image setting portion includes a preview portion that allows the user to visually recognize a candidate of an image to be printed on each of the print surfaces.

4. The print control device of claim 3, wherein
the controller displays the preview portion on each of the print image setting portions.

5. The print control device of claim 3, wherein
the controller displays an image in which the candidate of the image overlaps the print surface as the preview portion.

6. The print control device according to claim 1, wherein
the print image setting portion includes a print image selection portion for the user to select an image to be printed on each of the print surfaces, and wherein
the reception unit receives an operation, by the user via the input device, of selecting an image to be printed on each of the print surfaces.

7. The print control device of claim 1, wherein
the controller displays, on the display device, a workpiece information selection portion for the user to select the workpiece information, wherein
the reception unit receives an operation, by the user via the input device, of selecting the workpiece information, and wherein
the acquisition unit acquires the workpiece information based on the selection of the workpiece information received by the reception unit.

8. The print control device of claim 1, wherein
the workpiece information includes information about a name of each of the print surfaces.

9. The print control device of claim 8, wherein
the controller displays a name of each of the print surfaces in association with the print image setting portion based on the workpiece information.

10. The print control device of claim 1, wherein
the workpiece information includes information about a size of each of the print surfaces.

11. The print control device of claim 10, wherein
the print image setting portion includes a print image selection portion for the user to select an image to be printed on each of the print surfaces, wherein
the reception unit receives an operation, by the user via the input device, of selecting an image to be printed on each of the print surfaces, and wherein
the controller displays an error message on the display device when determining that a size of an image selected by the user using the print image selection portion is larger than a size of a print surface, in association with the size of the image selected by the user, included in the workpiece information.

12. A three-dimensional object printing apparatus comprising:
a print control device according to claim 1; and
a head that ejects a liquid under control of the print control device.

13. The print control device of claim 1, wherein
the acquisition unit that acquires the workpiece information, the workpiece information including information about the number of discrete print surfaces of the workpiece, and
the controller that displays, on the display device, the print image setting portion for the user to set an image to be printed on each of the discrete print surfaces.

14. The print control device of claim 1, wherein
the controller displays a delete button corresponding to each of print image setting portions for the user to delete the print image setting portion.

15. A print control method of controlling printing on a three-dimensional workpiece, the method comprising:
a first step of acquiring workpiece information including information about the number of print surfaces of the workpiece, an image being printed on each of the print surfaces; and
a second step of displaying, on a display device, a print image setting portion for a user to set an image to be printed on each of the print surfaces, wherein
the number of the print image setting portions displayed in the second step is changed according to the workpiece information selected in the first step,
N print image setting portions are displayed when the first workpiece information is selected in the first step, and
M print image setting portions are displayed when the second workpiece information different from the first workpiece information is selected in the first step.

16. A non-transitory computer-readable storage medium storing a computer program for controlling printing on a three-dimensional workpiece, the computer program causing a computer to execute:
an acquisition function of acquiring workpiece information including information about the number of print surfaces of the workpiece, an image being printed on each of the print surfaces;
a control function of displaying, on a display device, a print image setting portion for a user to set an image to be printed on each of the print surfaces; and
a reception function of receiving an operation by the user via an input device, wherein the control function changes the number of the print image setting portions to be displayed on the display device according to the workpiece information,
the controller displays, on the display device, the N print image setting portions when the workpiece information is first workpiece information, and displays, on the display device, the M print image setting portions when the workpiece information is second workpiece information different from the first workpiece information.

* * * * *